United States Patent
Peck et al.

(10) Patent No.: US 6,814,151 B1
(45) Date of Patent: Nov. 9, 2004

(54) KNOCK-ON SWEEP STRUCTURE HAVING MOUNTING SIDE SURFACES DIVERGING AT DIFFERENT RATES IN THE WEDGING DIRECTION

(75) Inventors: Donald Ray Peck, Clive, IA (US); Benoit Jocelyn Poutre, Elkhart, IA (US); Mark Donald Beeck, Ankeny, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/426,779

(22) Filed: Apr. 30, 2003

(51) Int. Cl.[7] .............................................. A01B 23/02
(52) U.S. Cl. ....................................................... 172/750
(58) Field of Search ................................ 172/730, 762, 172/750, 753, 751, 769, 749, 772.5; 37/457, 456, 455; 403/379, 374

(56) References Cited

U.S. PATENT DOCUMENTS

| | | | | |
|---|---|---|---|---|
| 2,258,932 A | * | 10/1941 | Jacobs | 403/325 |
| 3,061,021 A | | 10/1962 | Shader | 172/750 |
| 3,220,489 A | * | 11/1965 | Repka | 172/750 |
| 3,563,318 A | | 2/1971 | Eberhardt | 172/750 |
| 5,007,484 A | | 4/1991 | Johanson | 172/1 |
| 5,465,796 A | | 11/1995 | Buescher et al. | 172/762 |
| 5,558,165 A | | 9/1996 | Bucher et al. | 172/721 |
| 5,711,378 A | | 1/1998 | Yeager | 172/730 |
| 6,289,996 B1 | | 9/2001 | Parish | 172/730 |
| 6,315,058 B1 | * | 11/2001 | Birkenbach et al. | 172/762 |

OTHER PUBLICATIONS

Picture of a McKay sweep removal tool (RRT–1), date unknown, but believed to be commercially available.
Deere & Company, patent application filed Oct. 19, 2001, Ser. No. 09/982,901 entitled "Knock–On Sweep Structure and Tool Therefor".
Deere & Company, patent application filed Oct. 10, 2002, Ser. No. 10/268,581 entitled "Knock–On Sweep Structure".

* cited by examiner

*Primary Examiner*—Robert E Pezzuto

(57) ABSTRACT

Knock-on sweep structure includes a wedge adapter having opposite sides with upper and lower surfaces that engage the wrap-around portion of the sweep stem. The upper and lower surfaces diverge at different rates from a narrow end to a wide end to improve sweep-adapter contact. In one embodiment, the upper and lower surfaces on each side are planar and define a compound angle. The differential rate of divergence assures early contact between the adapter and stem at a plurality of spaced locations for improved retention and more reliable sweep positioning.

17 Claims, 4 Drawing Sheets

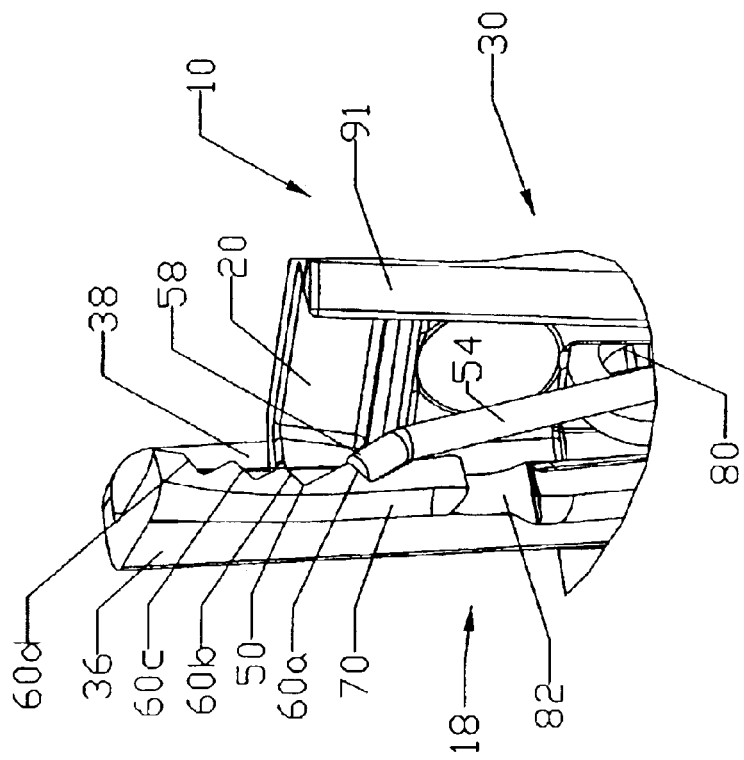
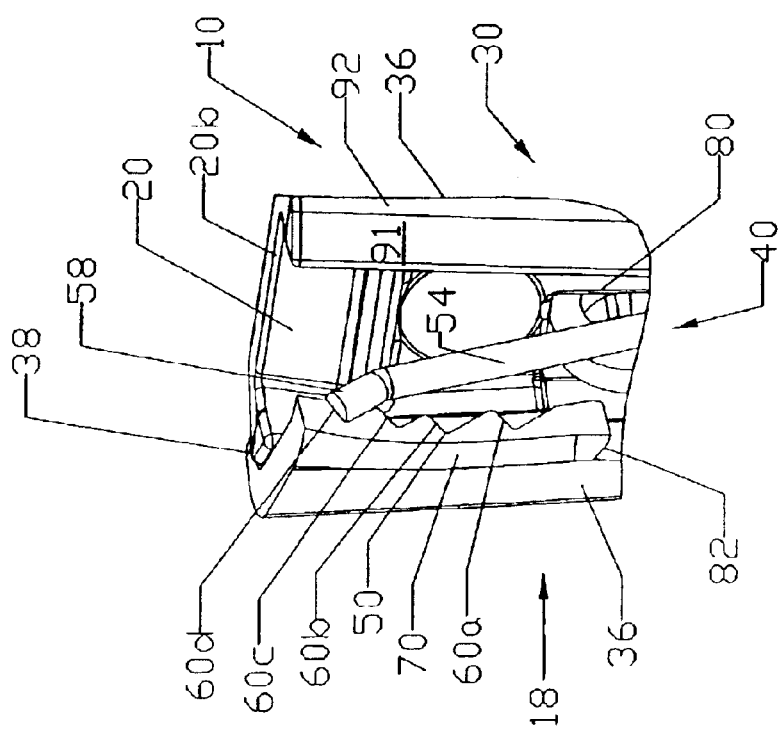

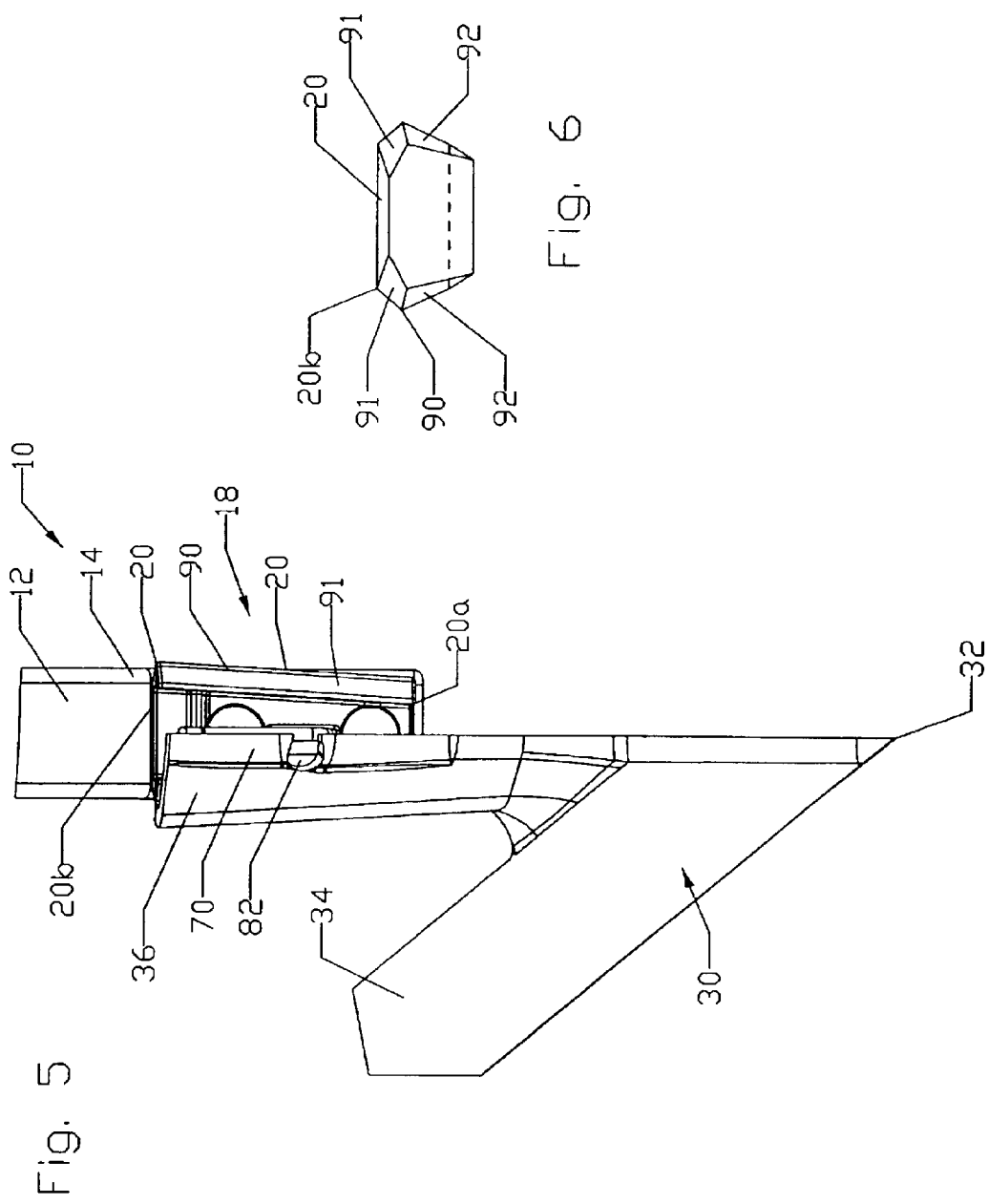

US 6,814,151 B1

KNOCK-ON SWEEP STRUCTURE HAVING MOUNTING SIDE SURFACES DIVERGING AT DIFFERENT RATES IN THE WEDGING DIRECTION

FIELD OF THE INVENTION

The present invention relates to replaceable tools for agricultural implements and, more specifically, to knock-on tools such as knock-on sweeps which are received over and retained by a wedge-shaped support or adapter on a shank or other tool support.

BACKGROUND OF THE INVENTION

With at least most previously available tillage tool quick change systems, properly mating the sweep with the adapter has been a continuing source of difficulty. Inability to hold tight manufacturing tolerances, particularly during forging or casting processes and during formation of the engaging surfaces on the sweep stem, can result in an overly loose fit which results in lost sweeps, or an excessively tight fit between the adapter and the mating portion so that mounting the sweep requires much force. The problems with fit are magnified, for example, when one of the mating components is undersized and the other component is oversized. With most available structures, optimizing the sweep-adapter contact surface is difficult or impossible. Since sweep-adapter contact provides primary retention and support for the sweep, a poor sweep-adapter contact results in a loose mounting or difficulty in mounting the sweep and inadequate sweep retention.

Because of the sweep forming process used during manufacture, the lower portions of many knock-on sweep stems roll out or widen causing the spacing between the engaging surfaces at the bottom of the stem to increase. This widening of the lower engaging surfaces increases the potential for sweep loss during operation since forces tending to rip the sweep from the adapter act primarily near the bottom of the stem.

To provide optimum sweep support and retention, eight contact points or four contact pair locations between the adapter and the engaging surfaces of the sweep stem must be established. The stem roll out or widening requires the sweep be driven farther onto the adapter before such eight-point contact can be made. Vertical variations in the final sweep mounting locations can cause unacceptable variations in the depth of penetration of the sweeps across the implement.

SUMMARY OF THE INVENTION

It is therefore an object of the present invention to provide an improved adapter for a knock-on sweep or similar earthworking tool. It is a further object to provide such an adapter which overcomes most or all of the aforementioned problems.

It is another object of the present invention to provide an improved adapter for a knock-on sweep or similar earthworking tool which provides more reliable and more predictable sweep-adapter contact for better retention and support. It is another object to provide such an adapter which improves sweep-adapter fit at locations where forces tending to remove the sweep from the adapter are localized.

To optimize the surface contact between a sweep stem and an adapter, upper and lower contact surfaces on each side of the adapter are configured to provide differential widening. The rate of change of distance between opposite upper surfaces is greater than the rate of change of the distance between the lower surface in a direction towards the widest portion of the wedge. As the width of the adapter decreases from the widest end towards the narrowest end to define the wedge, the lower surfaces narrow at a lesser rate to hasten contact between the lower contact surfaces and lower wrap around portion on the stem.

In one embodiment, each side of the adapter includes first and second generally planar surfaces intersecting at an edge and forming a compound angle. As the width of the adapter decreases from the widest end towards the narrowest end to define the wedge, the lower surfaces narrow at a lesser rate than that of the upper surfaces. The compound angle structure results in an increased effective width at the narrow lower end of the adapter as the contact surfaces are engaged by the lower wrap around portion of the stem. The increased effective width defined by the differential widening in the direction of the wedge assures engagement of all the desired contact points earlier and at a more predictable location than with a standard straight wedge configuration typical of the prior art devices.

In the embodiment described below, the adapter is fabricated as a casting to facilitate incorporation of a compound angle design. The adapter compound angle creates a better sweep-adapter mating surface structure to increase the wedge between the mating surfaces and provides improved spaced contact point locations for stability. The improved wedge therefore results in superior sweep retention and a firmer connection between the sweep and the adapter. Problems of inability to easily slip the sweep on the adapter and improper fit between the sweep and adapter are substantially reduced or eliminated. The adapter compound angle compensates for unpredictable complex shape formations created during the formation of the engaging surfaces on the stem of the sweep. The compound surface design is particularly useful with sweep retaining structures which rely on operating forces to wedge the sweeps in a final mounted position and thereby allow sweeps to be hand mounted without substantial force.

These and other objects, features and advantages of the present invention will become apparent from the description below in view of the drawings.

BRIEF DESCRIPTION OF THE INVENTION

FIG. 3 is a view of the stepped retainer receiving portion of the sweep of FIGS. 1 and 2 and showing the retainer at an initial attaching location relative to the retainer-receiving portion.

FIG. 4 is a view similar to that of FIG. 3 but showing the retainer at a location wherein wedging occurs at a relatively high mounted location.

FIG. 5 is a front view of the shank assembly of FIG. 1 with a portion of the sweep removed to better show the mounting adapter.

FIG. 6 is a view better illustrating surface angles of the compound angle structure on the sweep retaining structure.

DETAILED DESCRIPTION OF THE INVENTION

Figure 1:
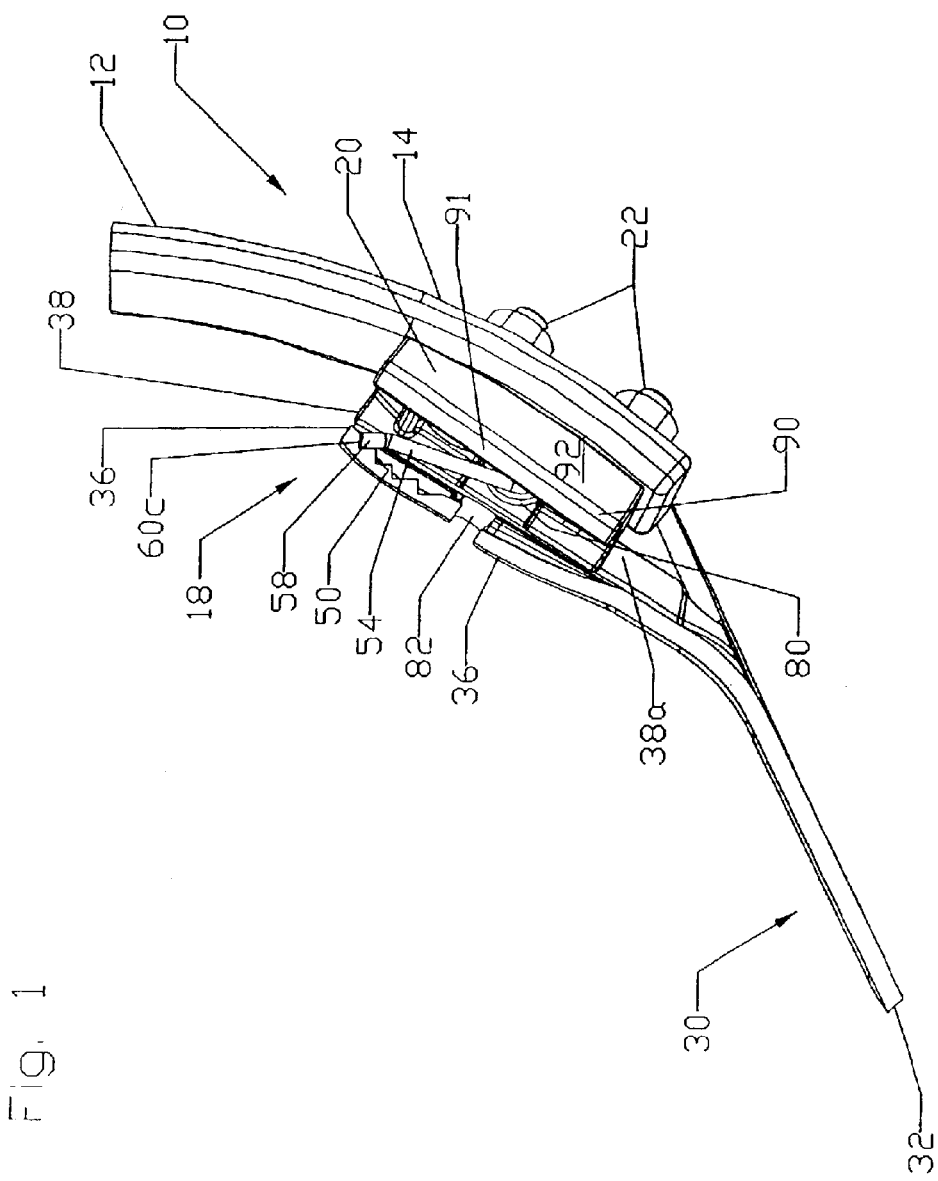
FIG. 1 is a side perspective view, partially in section, of a lower portion of a shank assembly including a sweep and sweep retaining structure.
Figure 2:
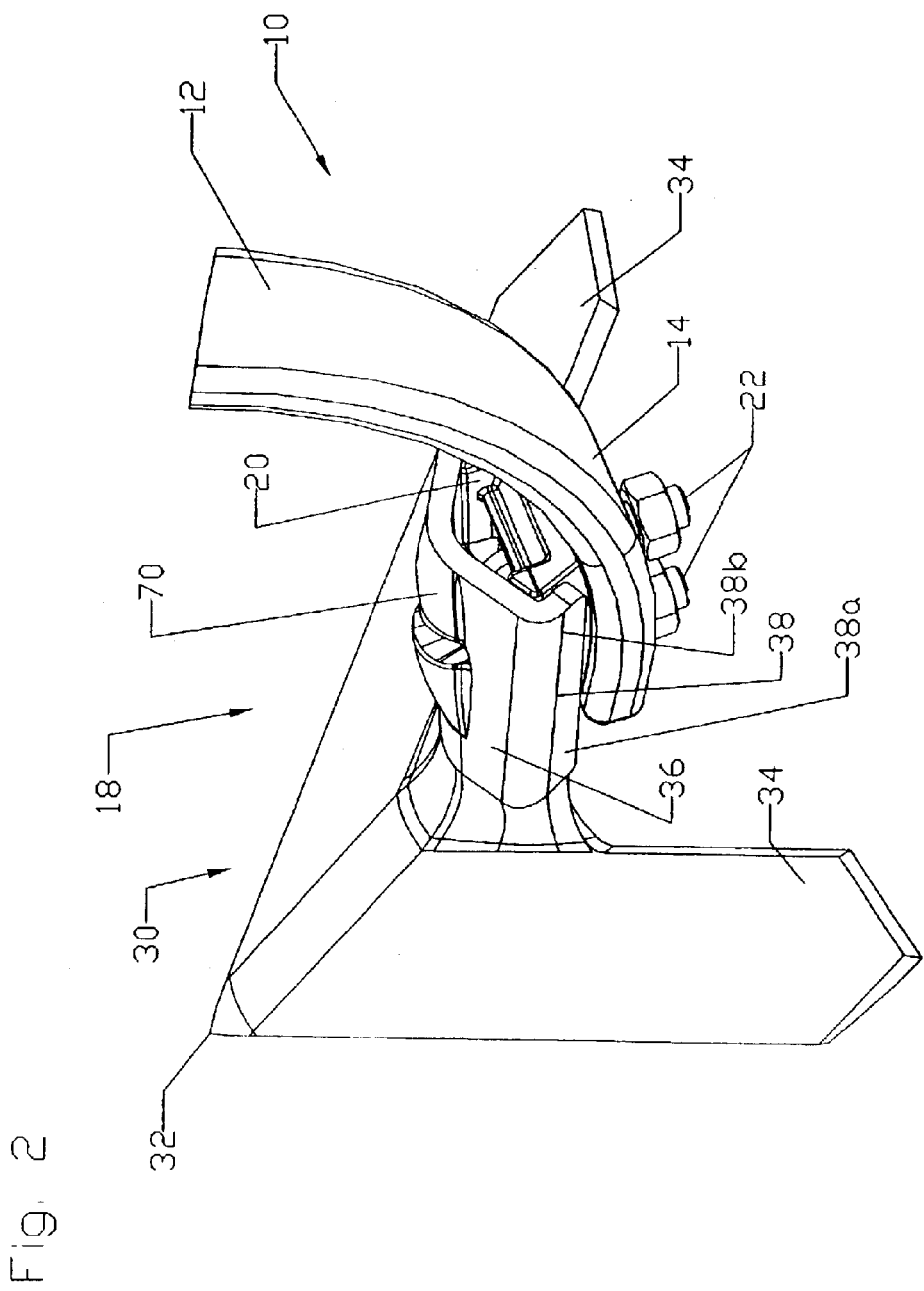
FIG. 2 is a top perspective view of the assembly of FIG. 1.

Referring now to FIGS. 1 and 2, therein is shown the lower portion of a spring trip shank assembly 10 including a shank 12 having a lower tool-mounting end 14 supporting a knock-on sweep assembly 18. The assembly 18 includes a wedge-shaped adapter bracket or sweep support 20 having an aft face conforming to the forward face of the end 14. The support 20 is secured to the end by two plow bolts 22 extending through apertures in the sweep support 20 and corresponding apertures in the end 14 of the shank 12. Alternatively, the support 20 may be fabricated as part of the shank 12.

An earthworking tool 30, shown as a cultivator sweep, includes a forwardmost tip or point 32 and opposed wing portions 34 diverging outwardly in the rearward direction. A downwardly and rearwardly concave sweep mounting portion or stem 36 includes gripping edges or contact portions 38 which wrap partially around the sweep support 20. The stem portion 36 provides a wedge fit between the tool 30 and the lower end 14 of the shank 12 when the tool 30 is urged upwardly onto the sweep support 20. The portion 36 is slid upwardly over the bracket 20 and then the tool 30 is forced upwardly and rearwardly to wedge the tool into the mounted position on the shank 12.

The sweep mounting portion 36 and the sweep support 20 firmly support the tool 30 on the end 14 without need for mounting bolts directly connected to the sweep 30. Since sweep mounting bolts are eliminated, the sweeps can be quickly driven from the support 20 and easily replaced. However, rebound forces and the like can loosen the wedge fit while operating in the field. The tool may also be lost in transport especially if it is not wedged on properly before being operated in the soil. To prevent loss of the tool 30 if the wedge fit is loosened during operation or transport, retaining structure indicated generally at 40 is provided. The normal forces operating on a sweep working in the ground tend to urge the sweep back into the wedge fit or mounted position if the sweep can be retained on the sweep support 20 after the undesired loosening.

The sweep retaining structure 40 may be generally of the type set forth in copending and commonly assigned U.S. application Ser. No. 10/268,581 entitled KNOCK-ON SWEEP STRUCTURE filed 10 Oct. 2002 and includes an elongated contact area 50 located on the underside of the sweep at the upper portion of the stem or attaching portion 36. A retainer 54 is carried by the sweep support 20 and includes a contact end 58 which is offset forwardly and above the top or forward surface of the sweep support 20. The contact end 58 is biased towards the underside of the stem 36. The end 58 abuts or lies closely adjacent one of a plurality of spaced, flat contact areas 60a, 60b, 60c and 60d in a loss prevention position when the sweep 30 is in the mounted position or in an initial unwedged attachment position (FIG. 3.). The end 58 abuts a central contact area 60c when mounted. However, if tolerances between the stem portion 36 and the support 20 are such that a tighter fit is provided and the sweep wedges in the mounted position sooner on the shank (near the initial position of FIG. 3), an area 6d above the central area will receive the end 58 in retaining relationship. If tolerances are such that the fit is looser, the sweep will move farther up relative to the shank, and an area (60a in FIG. 4) below the central area 60c will receive the end 58 for shank retention. The surfaces of the area 60c and the end surface of the end 58 are generally parallel to each other when in contact. The contact prevents the sweep from moving a substantial distance away from the mounted position until the end 58 is moved toward the sweep support 20 against the bias.

The stem 36 of the sweep 30 includes a raised or blind channel area 70 which defines a retainer guiding and support area on the underside of the raised area. The underside of the raised area 70 is concave downwardly and rearwardly and opens in the rearward direction towards the support 20. The contact areas 60a–60d are formed on the underside of the area 70 and define a plurality of spaced one-way locking positions. As shown in FIGS. 1, 3 and 4, the area 50 is stepped to define the areas 60a–60d in a blind recess so that soil and debris do not impinge or build up on the contact area during operation in the field.

As the sweep 30 is initially slipped onto the support 20 by hand, the retainer 54 is urged downwardly and moves into the area 60d (FIG. 3) to loosely hold the sweep in an initial non-wedging position on the support 20. When the implement is operated in the soil, the forces acting on the sweep 30 force the sweep into a wedge lock position on the support 20. During this upward movement, as each apex of the stepped area passes the end 58, the retainer 54 springs into the next adjacent recess. The retainer provides the retaining function against the corresponding one of the areas 60a–60d if the sweep begins to move from the mounted position. Alternatively, the retainer may be provided on the sweep, such as in the form of a downwardly biased tab or spring member.

The retaining structures described above provide a one-way or ratchet type securing arrangement with multiple retaining positions so that the abutment position is closely adjacent the mounted position and sweep travel relative to the support 20 remains small if the sweep begins moving from the fully mounted wedged position regardless of the tolerances between components. The offset retaining area allows easy initial hand mounting of the sweep and retention of the sweep until the operating forces move the sweep into a wedge locked mounting position.

As shown in FIGS. 1, 3 and 4, the retainer 54 is a bent spring wire supported by an area 80 at a central location on the support 20. As the sweep 30 is forced upwardly and rearwardly onto the sweep support 20, the end 58 springs into the channel-shaped underside of the area 70. If the sweep 30 begins to move downwardly away from the wedged position, the contact between the end 58 and the corresponding one of the contact areas 60a–60d holds the sweep closely adjacent the fully wedged position until the soil forces acting on the sweep during operation again wedge the sweep into the locked position. The channel-shaped underside at 70 also supports the end 58 of the wire retainer 54 at points generally on-axis to help the retainer resist bending moments that would otherwise occur when strong sweep-removing forces such as rebound forces are acting to dislodge the sweep. The opposite raised area on the top of the sweep directs soil outwardly around the sweep retaining structure 40 to limit abrasive wear in that area.

To remove the sweep 30, a tool may be inserted through a hole 82 in the stem 36 to urge the retainer 54 downwardly away from abutment with the contact area. With the retainer depressed, a sharp downward blow with a hammer or other downward pressure from a removal tool will drive the sweep from its wedged mounted position on the support 20. Although a spring retainer is shown, it is to be understood that the adapter structure described below may be utilized with other types of retainers and also with wedging arrangements without additional retainers. Although a winged tillage sweep is shown, the adapter structure is also useful with many other types of replaceable earthworking tools.

During formation of the sweep 30 from steel, the material in the stem 36 rolls out slightly towards the flat part of the sweep, and lower portions or desired lower contact areas 38a of the gripping portions 38 will spread correspondingly. As a result, conventional straight-sided wedge configurations often contact the stem 36 at upper contact areas 38b first, and the sweep must be forced upwardly before the lower portions 38a initiate contact. The forces acting on the sweep 30 to dislodge the sweep from the support 20 during operation typically act through an area corresponding to the contact areas 38a, and if the areas are not firmly wedged, sweep retention characteristics are compromised. In addition, the initial support position during mounting and the final wedged operating position of the sweep 30 on the support can vary considerably. The contact areas 38a and 38b are located near the corners of the adapter 20 in the mounted position of the sweep.

The improved wedge shaped support or adapter 20 (FIGS. 5 and 6) includes sides 90 with first and second, or upper and lower, surfaces 91 and 92 which diverge from a lower narrow end 20a to an upper wide end 20b of the adapter. The rate of convergence of the lower surfaces 92 (that is, the rate in change in distance between corresponding points on opposite surfaces 92) from the wide end 20b to the narrow end 20a is less than the rate of convergence of the upper surfaces 91. The lower rate of convergence of the lower surfaces 92 assures contact of the desired contact points on the adapter 20 with the embracing or contact portions 38 when the wedge-fit is provided. Also, the resulting increased spacing between the lower surface 92 adjacent the narrow end 20a assures more coordinated contact at or closely adjacent critical contact areas adjacent the areas 38a and 38b and corresponding spaced locations on the surfaces during initial engagement of the portion 38 with the wedge support 20 (FIG. 3). This better coordination resulting from the convergence rate differences provides more reliable and predictable multi-point contact to facilitate initial hand mounting, final tool position control, and sweep retention.

As depicted in FIG. 6, the surfaces 91 and 92 are planar and form compound angles. It has been found that reliable and repeatable multi-point contact is provided when the included angle between the planes of the surfaces 91 and 92 on each side is approximately 96 degrees at the wide end 20b and decreases to approximately 91 degrees at the narrow end 20a, and the angle of the lower surface relative to a plane perpendicular to the plane of the lower surface of the support decreases from about 29 degrees at the wide end 20b to about 26 degrees at the narrow end 20a. However, other types of surfaces and other angle configurations may also be used, and the above specifications are provided only by way of example. For example, it is possible to maintain a constant included angle and rotate the surfaces about the edge defined by the juncture of the surfaces 91 and 92 in the direction of narrowing of the wedge or provide slightly curved surfaces to provide differential widening. Also, although the above-described structure provides in an increased effective width of surfaces from the wide end towards the narrow lower end of the adapter, if a particular sweep and sweep stem formation process results in the stem widening more in an opposite direction, the direction of increased effective width can be reversed to assure that the contact surfaces are properly engaged by the stem.

Having described the preferred embodiment, it will become apparent that various modifications can be made without departing from the scope of the invention as defined in the accompanying claims.

What is claimed is:
1. An adapter with diverging sides for an agricultural knock-on tool, the tool including a stem having an elongated embracing portion with opposed surfaces at least partially wrapping around opposite sides of the adapter and providing a wedge-fit with the adapter as the stem is urged in a wedging direction, wherein the sides of the adapter include upper and lower surfaces, the upper and lower surfaces converging in a direction opposite the wedging direction towards a narrow end of the adapter to facilitate mounting and wedging of the tool on the adapter, wherein rate of convergence of the lower surfaces is less than rate of convergence of the upper surfaces.

2. The adapter as set forth in claim 1 wherein the upper and lower surfaces are generally planar and form compound angles.

3. The adapter as set forth in claim 1 wherein the upper and lower surfaces include a plurality of initial contact points which engage the embracing portion during mounting of the sweep, the lesser rate of convergence of the lower surfaces insuring initial contact between an extremity of the embracing portion and the narrow end of the adapter.

4. The adapter as set forth in claim 3 wherein the upper and lower surfaces are generally planar and form compound angles.

5. The adapter as set forth in claim 1 including desired contact points at the narrow end providing primary wedging support for the tool during operation of the tool in a field, the lower rate of convergence of the lower surfaces assuring contact of the desired contact points with the embracing portion when the wedge-fit is provided.

6. The adapter as set forth in claim 5 wherein the upper and lower surfaces include a plurality of initial contact points which engage the embracing portion during mounting of the sweep, the lesser rate of convergence of the lower surface insuring initial contact between an extremity of the embracing portion and the narrow end of the adapter.

7. Retaining structure for a knock-on tool for a tillage implement having a forward end and a tool mounting stem located rearwardly of the forward end, the retaining structure including:
   an elongated engaging portion located on the stem and having down-turned sides;
   a wedge support adapted for mating with the engaging portion and providing a tight but releasable wedged fit position as the sweep is moved in a wedging direction relative to the wedge support, the wedge support including opposite sides diverging in the wedging direction, the opposite sides having upper and lower contact surfaces engaging the down-turned sides at spaced locations on the engaging portion;
   wherein the upper and lower contact surfaces converge in a direction opposite the wedging direction towards a narrow end of the adapter to facilitate mounting and wedging of the tool on the adapter, wherein rate of convergence of the lower surfaces is less than rate of convergence of the upper surfaces.

8. The retaining structure as set forth in claim 7 wherein the stem includes spaced locations and the wedge support includes a retainer engaging one of the spaced locations at an initial low impact mounting location, the lower rate of convergence of the lower contact surfaces initiating contact between the lower surfaces and corresponding spaced locations on the engaging portion at or adjacent the initial mounting location.

9. The retaining structure as set forth in claim 8 including a retainer supported by the wedge support and biased into a locking position relative to the sweep to prevent movement of the sweep from the initial mounting position.

10. The retaining structure as set forth in claim 9 wherein the retainer comprises a spring member having an end biased towards the spaced retainer-receiving locations.

11. The retaining structure as set forth in claim 10 wherein the spaced retainer-receiving portions comprise a stepped area on the mounting portion of the sweep.

12. The retaining structure as set forth in claim 9 wherein the retainer includes an end having a flat surface and the stepped area includes a plurality of spaced flats generally parallel to the flat surface.

13. The retaining structure as set forth in claim 10 wherein the retainer comprises a wire and the sweep includes a channel-shaped underside area supporting the wire to help the wire resist bending moments.

14. A tool mounting adapter with opposing diverging first and second sides for an agricultural knock-on tool, the tool including a stem having an elongated embracing portion with opposed surfaces at least partially wrapping around the first and second sides and defining contact points providing a wedge-fit with the adapter as the stem is urged onto the adapter, wherein the first and second sides of the adapter include upper and lower surfaces, the upper and lower surfaces of the first and second sides converging in a first direction towards one end of the adapter to facilitate mounting and wedging of the tool on the adapter, wherein rate of convergence of the lower surfaces on the first and second sides varies from the rate of convergence of the upper surfaces to facilitate engagement of the contact points with preselected locations on adapter.

15. The tool mounting adapter as set forth in claim 14 wherein the adapter includes four corners and supports the stem with the contact points located adjacent the corners.

16. The tool mounting adapter as set forth in claim 14 including a retainer facilitating initial hand mounting of the tool on the adapter, the difference in the rate of convergence insuring initial contact between the embracing portion and the adapter.

17. The tool mounting adapter as set forth in claim 14 wherein the upper and lower surfaces are generally planar and form compound angles.

* * * * *